United States Patent
Gyllner et al.

[19]

[11] Patent Number: 6,035,736
[45] Date of Patent: Mar. 14, 2000

[54] ADJUSTABLE PINION GEAR MOUNTING ARRANGEMENT

[75] Inventors: Sven Bertil Rud Gyllner, Soderhamn; Dan Erik Norman, Alfta, both of Sweden

[73] Assignee: Caterpillar Inc., Peoria, Ill.

[21] Appl. No.: 08/966,271

[22] Filed: Nov. 7, 1997

[51] Int. Cl.[7] .............................. B66C 23/84; F16H 35/08
[52] U.S. Cl. .............................. 74/397; 74/421; 414/687; 414/694; 212/247
[58] Field of Search .............................. 74/447, 448, 397, 74/395, 396, 421 A; 414/687, 694, 695.8; 212/245, 247

[56] References Cited

U.S. PATENT DOCUMENTS

| | | | |
|---|---|---|---|
| 3,452,624 | 7/1969 | Lorence | 74/805 |
| 3,811,577 | 5/1974 | Yancey | 212/69 |
| 3,888,357 | 6/1975 | Bauer et al. | 212/68 |
| 4,216,870 | 8/1980 | Bonneson et al. | 212/223 |
| 4,307,621 | 12/1981 | Merron | 74/421 |
| 4,488,447 | 12/1984 | Gebhardt | 74/397 |
| 4,746,264 | 5/1988 | Kishi et al. | 414/687 |
| 5,045,034 | 9/1991 | Almeda, Jr. | 212/245 |
| 5,078,285 | 1/1992 | Geyer et al. | 212/245 |
| 5,138,904 | 8/1992 | Lande et al. | 74/661 |

*Primary Examiner*—Mary Ann Battista
*Assistant Examiner*—William C Joyce
*Attorney, Agent, or Firm*—Alan J. Hickman

[57] ABSTRACT

A pinion gear rotatively connected to a drive motor is radially movable relative to a swing gear of a work machine by an eccentric member to adjust the backlash between the pinion and swing gears. A supporting bracket is supportingly connected to a second end portion of the pinion gear and maintains the second end of the pinion gear from radial movement. An adjustable stop engages the supporting bracket and further prevents radial movement of the pinion gear.

12 Claims, 4 Drawing Sheets

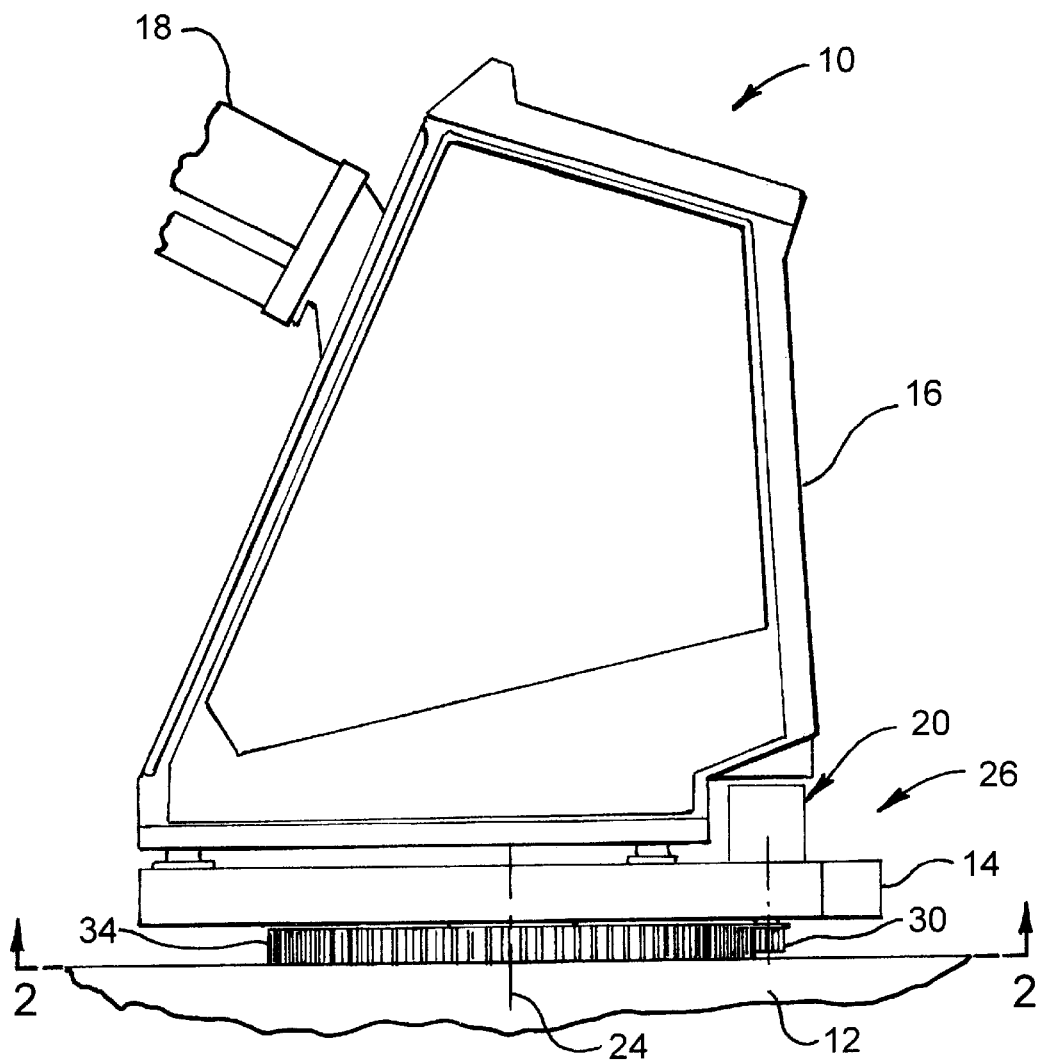
Fig. - 1 -

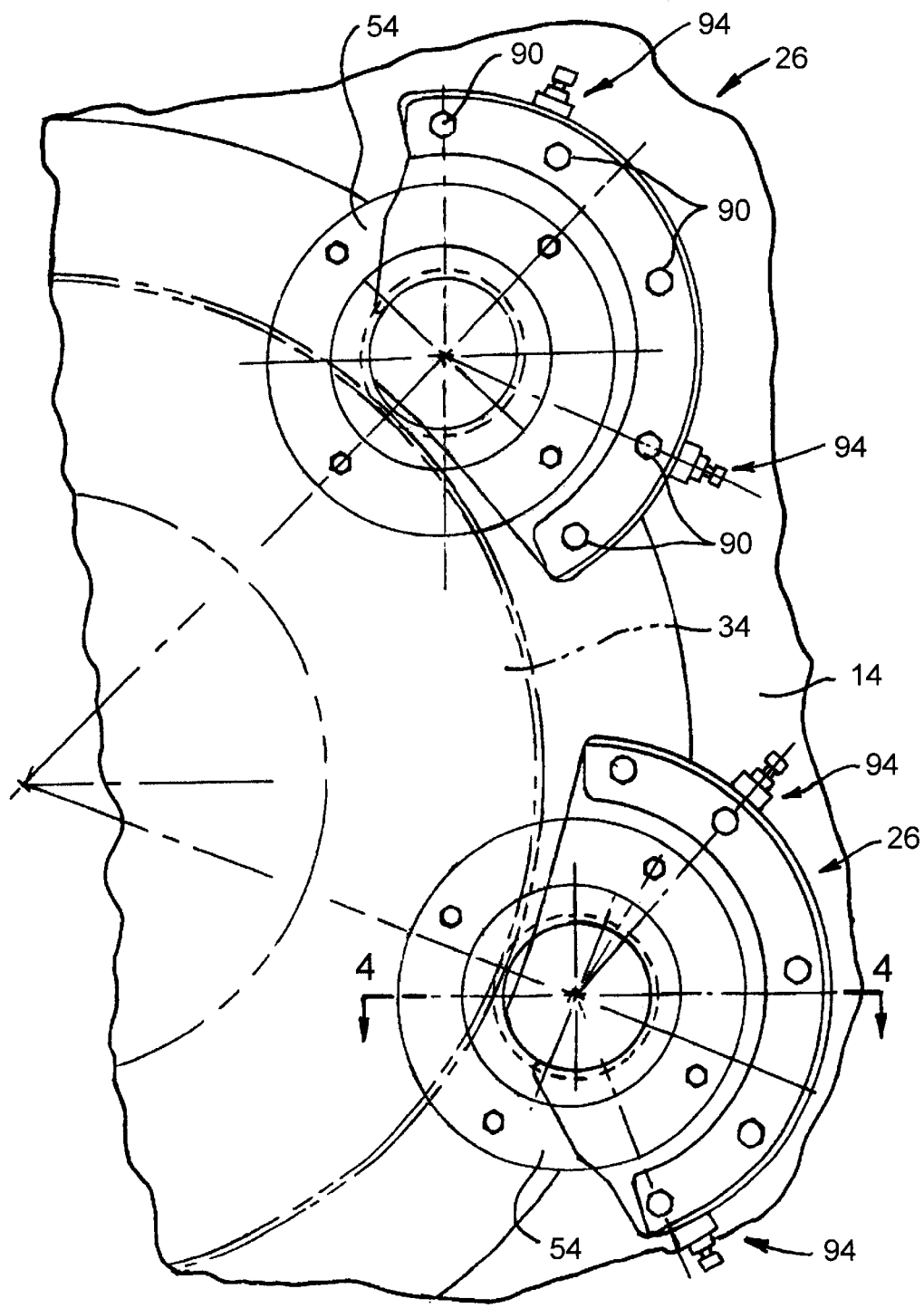
Fig. -2-

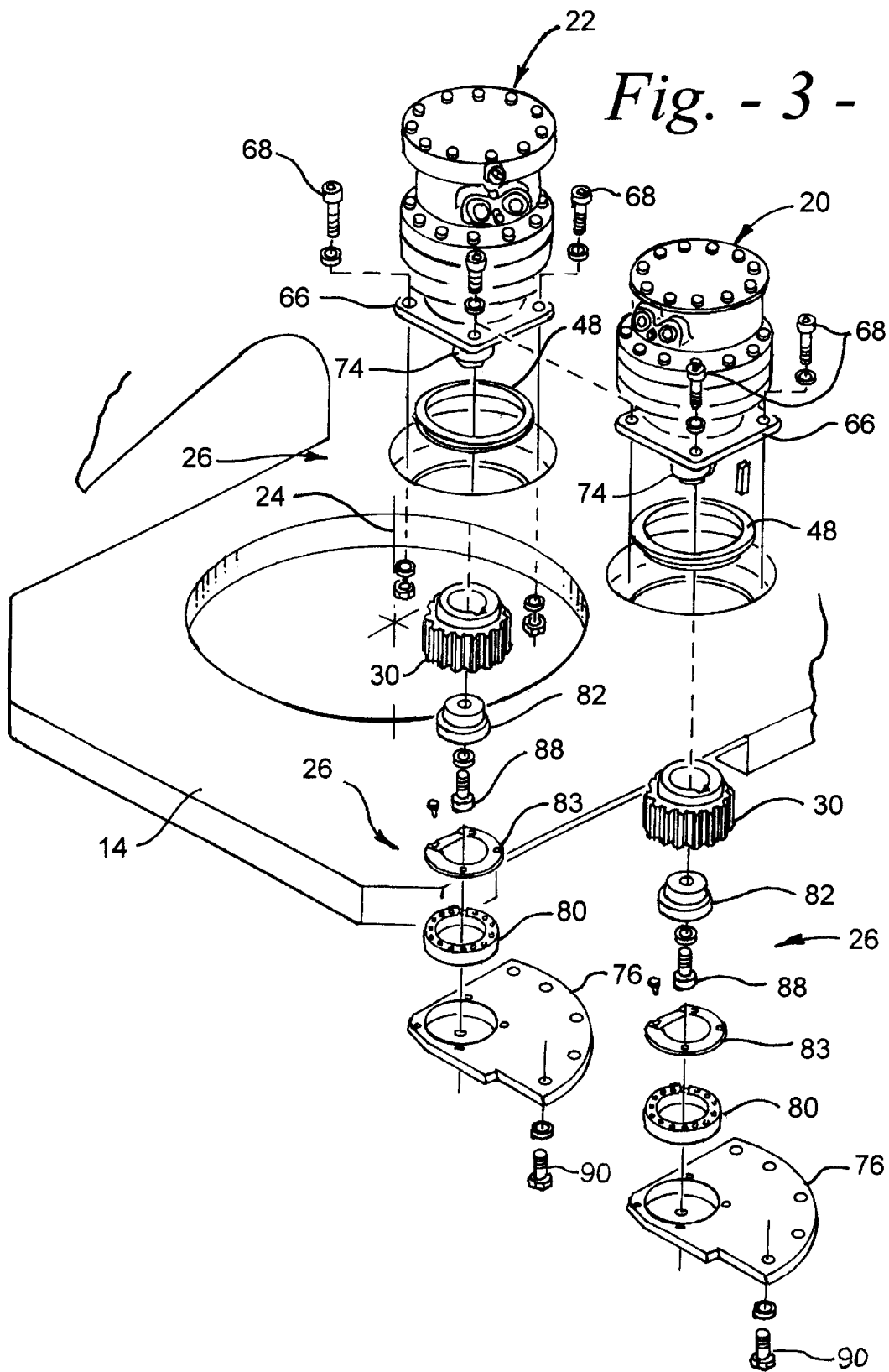

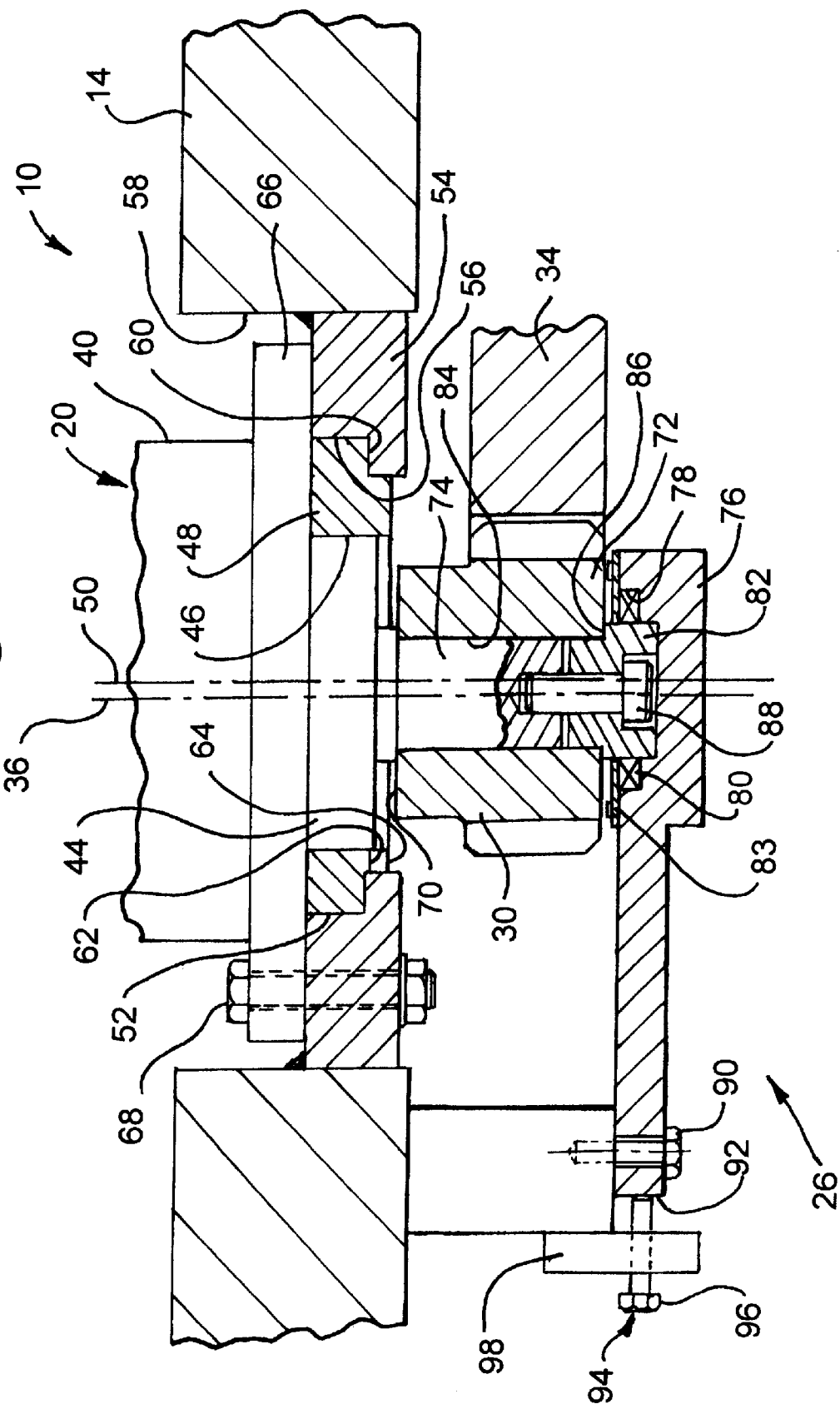
Fig. -4-

# ADJUSTABLE PINION GEAR MOUNTING ARRANGEMENT

TECHNICAL FIELD

This invention relates to a mounting arrangement for a pinion gear and more particularly to a mounting arrangement for adjustably positioning the pinion gear of a drive motor relative to a swing gear.

BACKGROUND ART

Pinion gears used to transfer rotary power from a drive motor to a swing gear of a work machine, for example, an excavator, a tree harvester and the like are well known in the art. Such gears are normally mounted on a shaft of the drive motor and engageable with the swing gear to cause rotation of a swing platform pivotally connected to a frame of the work machine.

The position of the pinion gear relative to the swing gear is accurately controlled in order to obtain a desired amount of backlash for maximum gear life and proper operation. Such accurate control is achieved by maintaining tight tolerances and a tight tolerance stack-up between associated parts. This, tends to be expensive to manufacture, takes an excessive amount of manufacturing time, and has a high manufacturing scrap rate.

It has been found that over time the mating gears tend to wear, especially when used in harsh environmental applications. Unless provisions are made for adjustment of the drive pinion relative to the swing gear the drive pinion and swing gear must be replaced. This major overhaul takes much time and requires that the machine is out of service during repairs. As earlier indicated, replacement part cost is extremely high.

In applications where the pinion gear is supported on a cantilevered drive shaft, the potential for premature shaft bearing failure and shaft bending under severe operating loads is high. Since the distal end of the shaft is not supported, radial loads applied to the pinion gear cause side loading of the shaft and a high moment of force. This side loading result in excessive drive motor bearing loading, shaft loading and premature failure of the components.

The present invention is directed to overcoming one or more of the problems as set forth above.

DISCLOSURE OF THE INVENTION

In one aspect of the present invention, an adjustable mounting arrangement for radially positioning a pinion gear of a drive motor relative to a swing gear of a work machine having a frame and a swing frame pivotally connected to the machine frame is provided. The pinion gear has an axis of rotation and is rotatively connected to a housing of the drive motor. A sleeve is disposed about the axis of rotation of the pinion gear and connected to the housing. An eccentric member has an eccentric bore and is rotatively supported on one of the swing and the machine frames. The eccentric member has an axis of eccentricity radially offset from the axis of rotation of the pinion gear and is adjustably rotatable about the axis of eccentricity relative to the one of the swing and the machine frames. The sleeve is disposed in the eccentric bore and the pinion gear is radially adjustably movable relative to the swing gear in response to rotation of eccentric member about the axis of eccentricity.

In another aspect of the present invention, an adjustable mounting arrangement for positioning a plurality of pinion gears, each having an axis of rotation, radially relative to a swing gear of a work machine is provided. The work machine has a frame and a swing frame pivotally connected to the frame. The pinion gears are respectively rotatively connected to a housing of a plurality of drive motors. A plurality of sleeves are disposed about the axes of rotation and connected to the housings. A plurality of eccentric members are rotatively supported on the swing frame at spaced apart locations. The eccentric members each have an eccentric bore and an axis of eccentricity. The sleeves are disposed in the eccentric bores. The axis of eccentricity of each of the eccentric members are radially offset from the axis of rotation of a respectively adjacent pinion gear. The eccentric members are rotatable about the axis of eccentricity of the respectively adjacent pinion gear relative to the swing frame. The pinion gears are radially adjustably movable relative to said swing gear in response to rotation of the eccentric members about the axes of eccentricity.

In yet another aspect of the present invention, the adjustable mounting arrangement has a supporting bracket connected to the one of the swing and machine frames and supportingly maintains a second end portion of the pinion gear from radial movement relative to the axis of rotation of the pinion gear.

BRIEF DESCRIPTION OF THE DRAWINGS

FIG. 1 is a diagrammatic partial side elevational view of an embodiment of the present invention showing a work machine with a pivotal swing frame and an adjustable mounting arrangement for adjustably positioning a pinion gear of a drive motor relative to a swing gear;

FIG. 2 is a diagrammatic sectional view taken along lines 2—2 of FIG. 1 showing the adjustable mounting arrangement in greater detail;

FIG. 3 is a diagrammatic exploded isometric view of the work machine of FIG. 1 with portions broken away showing the adjustable mounting arrangement in greater detail;

FIG. 4 is a diagrammatic cross-sectional view taken along lines 4—4 of FIG. 2.

BEST MODE FOR CARRYING OUT THE INVENTION

With reference to the drawings, and particularly FIG. 1, a work machine 10 having a machine frame 12 and a swing frame 14 pivotally connected to the machine frame 12 in any suitable conventional fashion is provided. The work machine 10 shown is a harvester used for harvesting trees. However, other work machines 10 having a pivotal swing frame 14, for example, an excavator, are considered equivalents and with in the scope of this invention.

The work machine 10 has an operators station 16 and a boom 18 mounted on the swing frame 14. The work station 16 and boom 18 rotate with the swing frame 14 in order to maximize operator visibility and controllability. A harvester head (not shown) is connected to a distal end of the boom 18. The harvester head is engageable with a tree to be harvested and provides an apparatus by which the tree may be cut, felled, delimbed, cut to length and marked. Harvester heads of this type are well known to those in the forestry industry and will not be discussed in any greater detail. It should be recognized that substantial forces are generated during the tree harvesting operation. Thus, it is important that the componentry related to swing frame 14 rotation is properly configured and robust enough to handle the forces.

As best seen in FIGS. 2 and 3, a pair of spaced apart drive motors 20,22 are provided for rotating the swing frame about a swing axis 24. The drive motors 20,22 are preferably, but not limited to, fluid operated motors of any suitable conventional motor construction capable of providing the force required to rotate the swing frame 14 about the swing axis 24. In the preferred embodiment, as shown, the drive motors 20,22 are connected to the swing frame 14. However, it should be recognized that the drive motors 20,22 may be connected to the machine frame 12 without departing from the spirit of the invention.

An adjustable mounting arrangement 26, one associated with each of the pair of drive motors, 20,22, is provided for radially positioning a pinion gear 30 of each of the pair of spaced drive motors 20,22 relative to a swing gear 34 connected to the machine frame 12. It should be recognized that when the drive motors 20,22 are optionally connected to the machine frame 12, the swing gear 34 is connected to the swing frame 14. Each of the pinion gears 30 have spaced apart substantially parallel axes of rotation 36. The pair of drive motors 20,22 each have a housing 40. The pinion gears 30 are rotatively connected to the respective housing 40. Since the construction of the drive motors 20,22 and the adjustable mounting arrangements 26 are identical, only one will be discussed in substantial detail. However, unless otherwise specified, any discussion related to one will also relate to the other.

Referring to FIG. 4, the adjustable mounting arrangement 26, includes a tubular round sleeve 44 disposed concentrically about the axis of rotation 36 of the pinion gear 30 and connected to the housing 40. The tubular sleeve 44 is disposed in an eccentric bore 46 of an eccentric member 48 rotatively supported on the swing frame 14. The eccentric bore 46 is preferably, cylindrical, round and concentric about the axis of rotation 36. The eccentric member 48 has an axis of eccentricity 50 which is radially offset from the axis of rotation 36 of the pinion gear 30. The eccentric member 48 is adjustably rotatable about the axis of eccentricity 50. The pinion gear 30 is radially adjustably movable relative to the swing gear 34 in response to rotation of the eccentric member 48 about the axis of eccentricity 50.

The eccentric member 48 has an outer surface 52 which is concentrically disposed about the axis of eccentricity 50 but radially offset from the axis of rotation 36 a preselected distance. A supporting flange 54 is disposed in a bore 58 in the swing frame 14 and connected to the swing frame 14 in any suitable manner, for example, by welding. The supporting flange 54 has a pilot bore 56 disposed therein. The pilot bore 56 is located at a predetermined location radially spaced relative to the swing gear 34. This location lies within the range of adjustment provided by the offset radial distance of the eccentric member 48. Therefore the tight tolerances normally demanded in fixed drive motor mountings is relaxed. The outer surface 52 of the eccentric member 48 is slidably engaged with at least a portion of the pilot bore 56 and maintains the eccentric member 48 from radial movement in the pilot bore 56 relative to the supporting flange 54.

The pilot bore 56 and the outer surface 52 preferably have a step 60 to hold the eccentric member 48 in the pilot bore during assembly and to enable a clamping force to be applied to the eccentric member 48. Subsequent to adjustment, the clamping force maintains the eccentric member 48 from rotation in the pilot bore 56.

A notch 62 is disposed in the eccentric member 48, extends between the eccentric bore 46 and the outer surface 52 and opens at a side 64 of the eccentric member 48. The notch 62 is provided to receive a tool to rotate the eccentric member 48 and radially adjust the position of the pinion gear 30 relative to the swing gear 34.

The housing 40 has a flange 66 connected thereto. The flange 66 engages the eccentric member 48 and forces the step 60 of the eccentric member 48 and supporting flange into engagement with each other. A plurality of fasteners 68 connect the flange of the housing 40 to the supporting flange 54 and provides a source of loading for the eccentric member 48. By this loading the eccentric member is restrained from inadvertent rotation.

The pinion gear 30 has first and second axially spaced opposite end portions 70,72. The pinion gear 30 is mounted on a drive shaft 74 rotatively connected to the housing 40 of the drive motor 20. The first end portion 70 of the pinion gear 30 faces the drive motor 20 and the second end portion 72 of the pinion gear 30 faces in a direction away from the drive motor 20.

A supporting bracket 76 is connected to the swing frame 14 and maintains the second end portion of 72 the pinion gear 30 from radial movement transversely relative to the axis of rotation 36 of the pinion gear 30. Specifically, the supporting bracket 76 has a bearing bore 78 disposed therein and an anti-friction bearing 80 disposed in the bearing bore 78. The anti friction bearing 80 is supportingly connected to the second end portion 72 of the pinion gear 30. Specifically, the anti-friction bearing 80 is disposed about a cylindrical retaining member 82 connected to and projecting from the second end portion 72 of the pinion gear 30. Preferably, the anti-friction bearing 80 is pressed on the retaining member 82. A bearing retainer 83, connected to the supporting bracket 76 by a plurality of threaded fasteners, retains the bearing 80 in the bearing bore 78 and from rotation therein.

The retaining member 82 is piloted in a bore 84 disposed axially in the pinion gear 30. The drive shaft 74 is also disposed in the bore 84. The retaining member 82 has a shoulder 86. The shoulder 86 is engaged with the second end portion 72 of the pinion gear 30. A threaded fastener 88 screwthreadably connects the retaining member 82 to the drive shaft 74. Specifically, the threaded fastener 88 forces the shoulder 86 into engagement with the second end portion of the pinion gear 30 and maintains the pinion gear 30 on the shaft 74 and from rotation relative to the shaft 74.

A plurality of fasteners 90 screwthreadably connect the supporting bracket 76 to the swing frame 14. The fasteners 90 are disposed in oversized holes in the supporting bracket 76 to permit alignment and positioning of the anti-friction bearing 80 relative to the axis of rotation 36 of the pinion gear 30. The supporting bracket 76 has a thrust end 92 which is oriented substantially parallel to the axis of rotation 36. The thrust end 92 is arcuate and defined by a radius generated about the axis of rotation 36.

A plurality of adjustable stops 94 are connected to the swing frame 14 and engageable with the thrust end 92. The adjustable stops 94 maintain the pinion gear 30 from radial movement and prevent bending of the drive shaft 74 under severe loading. The adjustable stops 94 each include a threaded fastener 96 screwthreadably connected to a fixed bracket 98 connected to the swing frame 14. The threaded fastener 96 is rotatable to engage the thrust end 92 subsequent to connection of the supporting bracket 76 to the swing frame 14.

INDUSTRIAL APPLICABILITY

With reference to the drawings, and in operation, the loads applied to the pinion gear 30 is resisted by the supporting bracket 76 and the bearing 80 carried by the supporting bracket 76. These loads are transferred by the supporting bracket 76 directly to the swing frame 14. This prevents bending of the drive shaft 74 and premature failure of the bearings of the drive motor 20. It is particularly important, in applications where debris may be collected by teeth of the pinion and swing gears 30,34, to provide support to the distal end of the drive shaft 74 at which the pinion gears 30 is mounted. It is to be recognized that although only the adjustable mounting arrangement 26 associated with the drive motor 20 is being discussed, the discussion also relates to the adjustable mounting arrangement 26 associated with the drive motor 22.

The plurality of adjustable stops 94 further insures that the supporting bracket 76 maintains the second end portion 72 of the pinion gear 30 from radial movement by engaging the thrust end 92 of the supporting bracket 76. Because of the adjustability provided by way of the oversized apertures through which the fasteners 90 extend, the adjustable stops are provided to absorb the thrust forces which would otherwise cause movement of the supporting bracket 76.

The ability to adjust the radial position of the pinion gear 30 relative to the swing gear 34 is important. The adjustable mounting arrangement 26 eliminates the need to maintain extremely tight manufacturing tolerances and as a result reduces scrap and rework. The adjustable mounting arrangement 26 also permits readjustment of the pinion gear 30 during the life of the work machine 10. Thus, any change in the backlash between the mating gear teeth of the pinion and swing gears 30,34, caused by normal operation is easily corrected.

The adjustment is achieved by simply loosening the fasteners 90 connecting the supporting bracket 76 to the swing frame 14 and the fasteners 68 connecting the flange 66 to the supporting flange 54. This frees the flange 66 of the drive motor 20 from loading the eccentric member 48 and facilitates free rotation of the eccentric member 48 in the pilot bore 56. A tool is placed in the notch 62 of the eccentric member 48 to facilitate rotation of the eccentric member 48 without removing the drive motor 20. This also facilitates ease of determining when the appropriate amount of backlash between gears 30,34 is achieved. Once the proper gear adjustment is made by way of rotation of the eccentric member 48, the fasteners 68 are tightened to clamp the flange 66 against the eccentric member 48 and the eccentric 48 member against the step 60. This maintains the eccentric member 48 in the bore 56 and from inadvertent rotation. The adjustable stop 94 is then adjusted so that the threaded fastener 96 engages the thrust end 92 of the supporting bracket 76. The work machine is now ready for operation.

Other aspects, objects and advantages of the present invention may be obtained by a study of the specification, the drawings, and the appended claims.

We claim:

1. An adjustable mounting arrangement, comprising:
   a machine frame;
   a swing frame pivotally connected to said machine frame;
   a drive motor having a housing and a drive shaft extending from said drive motor;
   a pinion gear having an axis of rotation and being rotatively connected to the housing, said pinion gear having first and second axially spaced opposite end portions and being mounted on the drive shaft, said pinion gear second end portion facing in a direction away from said drive motor;
   a sleeve disposed about the axis of rotation of said pinion gear and being connected to said housing;
   an eccentric member having an eccentric bore and being rotatively supported on a one of said swing and said machine frames, said eccentric member having an axis of eccentricity radially offset from said axis of rotation of said pinion gear and being adjustably rotatable about said axis of eccentricity relative to said one of the swing frame and the machine frames, said sleeve being disposed in said bore and said pinion gear being radially adjustably movable relative to said swing gear in response to rotation of said eccentric member about said axis of eccentricity;
   a supporting bracket having a bearing bore and being connected to said one of the swing and machine frames and supportingly maintaining the second end portion of said pinion gear from radial movement relative to the axis of rotation of the pinion gears;
   an antifriction bearing disposed in the bearing bore and supportingly connected to the second end portion of the pinion gear;
   a retaining member projecting axially from the second end portion of the pinion gear, said antifriction bearing being disposed about the retaining member;
   a bore disposed in the said pinion gear, said shaft and said retaining member being disposed in the bore of said pinion gear, said retaining member having a shoulder engaged with the second end portion of the pinion gear; and
   a threaded fastener connecting the retaining member to the shaft and forcing the shoulder into engagement with the second end portion of the pinion gear.

2. The adjustable mounting arrangement, as set forth in claim 1, wherein said eccentric member having an outer surface, including:
   a supporting flange connected to the swing frame,
   a pilot bore disposed in the supporting flange, said outer surface of the eccentric member being engaged with at least a portion of the pilot bore and maintaining the eccentric member from radial movement relative to the supporting flange.

3. The adjustable mounting arrangement, as set forth in claim 2, wherein said pilot bore and said outer surface are each stepped, and wherein said eccentric bore being cylindrical and radially offset relative to the axis of eccentricity of the outer surface.

4. The adjustable mounting arrangement, as set forth in claim 3, including a notch disposed in the eccentric member, said notch being engageable to rotate the eccentric member in said pilot bore and radially adjust the pinion gear relative to the swing gear.

5. The adjustable mounting arrangement, as set forth in claim 2, wherein said housing has a flange and including a plurality of fasteners connecting the flange of said housing to the supporting flange.

6. An adjustable mounting arrangement, comprising:
   a machine frame;
   a swing frame pivotally connected to said machine frame;
   a drive motor having a housing and a drive shaft extending from said drive motor;
   a pinion gear having an axis of rotation and being mounted on said drive shaft, said pinion gear having first and second axially spaced opposite end portions, said pinion gear second end portion facing in a direction away from said drive motor, said pinion gear being rotatable about the axis of rotation relative to said housing;
   a sleeve disposed about the axis of rotation of said pinion gear and being connected to said housing;

an eccentric member having an eccentric bore and being rotatively supported on a one of said swing and said machine frames, said eccentric member having an axis of eccentricity radially offset from said axis of rotation of said pinion gear and being adjustable rotatable about said axis of eccentricity relative to said one of the swing frame and the machine frames, said sleeve being disposed in said bore and said pinion gear being radially adjustably movable relative to said swing gear in response to rotation of said eccentric member about said axis of eccentricity;

a supporting bracket having a bearing bore and being connected to said one of the swing and machine frames and supportingly maintaining the second end portion of said pinion gear from radial movement relative to the axis of rotation of the pinion gear;

an antifriction bearing disposed in the bearing bore and supportingly connected to the second end portion of the pinion gear;

a plurality of fasteners connecting the supporting bracket to the swing frame, said supporting bracket having a thrust end; and an adjustable stop connected to the swing frame and being engageable with the thrust end, said adjustable stop maintaining the pinion gear from radial movement.

7. An adjustable mounting arrangement, comprising:

a machine frame;

a swing frame pivotally connected to said machine frame;

a plurality of drive motors each having a housing and a drive shaft extending from each of said drive motors;

a plurality of pinion gears each having an axis of rotation, first and second axially spaced opposite end portions and being mounted on the drive shafts, said second end portion of the pinion gears facing in a direction away from said drive motors, said pinion gears being rotatable about the axis of rotation relative to the housing;

a plurality of sleeves disposed about the axes of rotation and connected to the housings;

a plurality of eccentric members rotatively supported on said swing frame at spaced apart locations, said eccentric members each having an eccentric bore and an axis of eccentricity, said sleeves being disposed in the eccentric bores, said axis of eccentricity of each of said eccentric members being radially offset from the axis of rotation of a respectively adjacent pinion gear, said eccentric members being rotatable about the axis of eccentricity and relative to said swing frame, and said pinion gears being adapted to be radially adjustably movable relative to said swing gear in response to rotation of the eccentric members about the axes of eccentricity;

a plurality of supporting brackets connected at spaced locations to said swing frame and maintaining the second end portion of said pinion gears from radial movement relative to the axis of rotation of each pinion gear;

a bearing bore disposed in each of the supporting brackets;

an antifriction bearing disposed in each bearing bore, said antifriction bearing being supportingly connected to the second end portion of the pinion gear;

a retaining member projecting axially from the second end portion of each of the pinion gears, said antifriction bearing being disposed about the retaining member;

a bore being disposed in each of said pinion gears, said shaft and retaining member being disposed in the pinion gear bore, said retaining member having a shoulder, said shoulder being engaged with the second end portion of the pinion gear; and a threaded fastener connecting the retaining member to the shaft and forcing the shoulder into engagement with the second end portion of the pinion gear.

8. An adjustable mounting arrangement, comprising:

a machine frame;

a swing frame pivotally connected to said machine frame;

a plurality of drive motors each having a housing and a drive shaft extending from each of said drive motors;

a plurality of pinion gears each having an axis of rotation, first and second axially spaced opposite end portions and being mounted on the drive shafts, said second end portion of the pinion gears facing in a direction away from said drive motors, said pinion gears being rotatively movable about the axis of rotation relative to the housings;

a plurality of sleeves disposed about the axes of rotation and connected to the housings;

a plurality of eccentric members rotatively supported on said swing frame at spaced apart locations, said eccentric members each having an eccentric bore and an axis of eccentricity, said sleeves being disposed in the eccentric bores, said axis of eccentricity of each of said eccentric members being radially offset from the axis of rotation of a respectively adjacent pinion gear, said eccentric members being rotatable about the axis of eccentricity and relative to said swing frame, and said pinion gears being radially adjustable movable relative to said swing gear in response to rotation of the eccentric members about the axes of eccentricity;

a plurality of supporting brackets connected at spaced locations to said swing frame and maintaining the second end portion of said pinion gears from radial movement relative to the axis of rotation of each pinion gear;

a bearing bore disposed in each of the supporting brackets;

an antifriction bearing disposed in each bearing bore, said antifriction bearing being supportingly connected to the second end portion of the pinion gear;

a plurality of fasteners connecting the supporting brackets to the swing frame, said supporting brackets each having a thrust end; and an adjustable stop engageable with the thrust ends and maintaining the pinion gears from radial movement.

9. The adjustable mounting arrangement, as set forth in claim 8, wherein said eccentric members each having an outer surface, including a plurality of supporting flanges each having a pilot bore, said outer surface engaging at least a portion of the pilot bore and maintaining the eccentric members from radial movement.

10. The adjustable mounting arrangement, as set forth in claim 9, wherein the pilot bores and outer surfaces are each stepped and wherein said eccentric bores being cylindrical and radially offset relative to the axis of eccentricity of the outer surfaces.

11. The adjustable mounting arrangement, as set forth in claim 10, including a notch disposed in each eccentric member, said notch being engageable to facilitate rotation of each eccentric member in the pilot bore and radially adjust the position of each the pinion gear relative to the swing gear.

12. The adjustable mounting arrangement, as set forth in claim 9, wherein each housing has a flange and including a plurality of fasteners connecting said housing flange to the supporting flange.

* * * * *

UNITED STATES PATENT AND TRADEMARK OFFICE
CERTIFICATE OF CORRECTION

PATENT NO. : 6,035,736
DATED : March 14, 2000
INVENTOR(S) : Gyllner et al.

It is certified that error appears in the above-identified patent and that said Letters Patent is hereby corrected as shown below:

Column 7, line 14, please delete the first occurrence of --said--.
Column 7, line 17, please delete --said--.
Column 7, line 20, please delete --said--.

Signed and Sealed this

Twenty-fourth Day of April, 2001

Attest:

NICHOLAS P. GODICI

*Attesting Officer*     *Acting Director of the United States Patent and Trademark Office*